Oct. 6, 1925.
L. V. BENÉT
1,556,478
CARRIAGE FOR ANTIAIRCRAFT GUNS
Filed Feb. 28, 1925    9 Sheets-Sheet 2
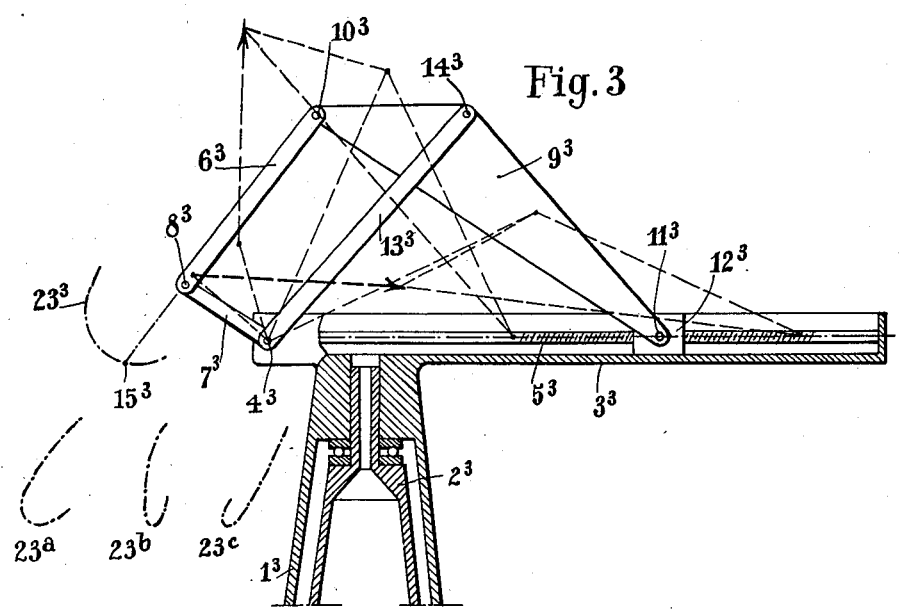
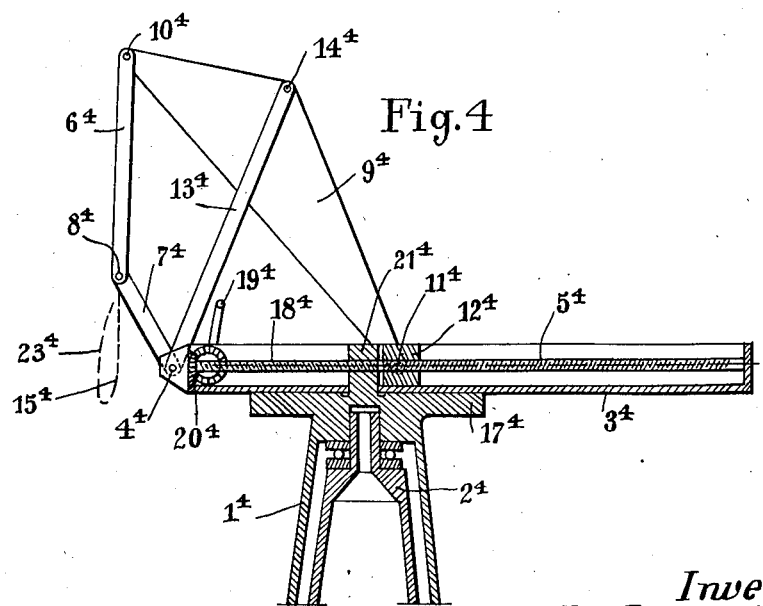
Inventor
L. V. Benét
by Wilkinson & Giusta
Attorneys.

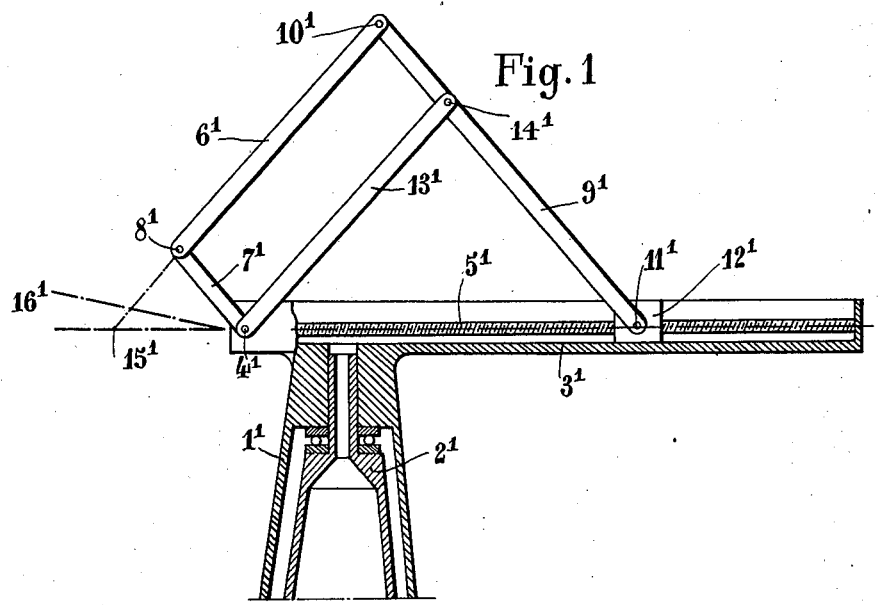
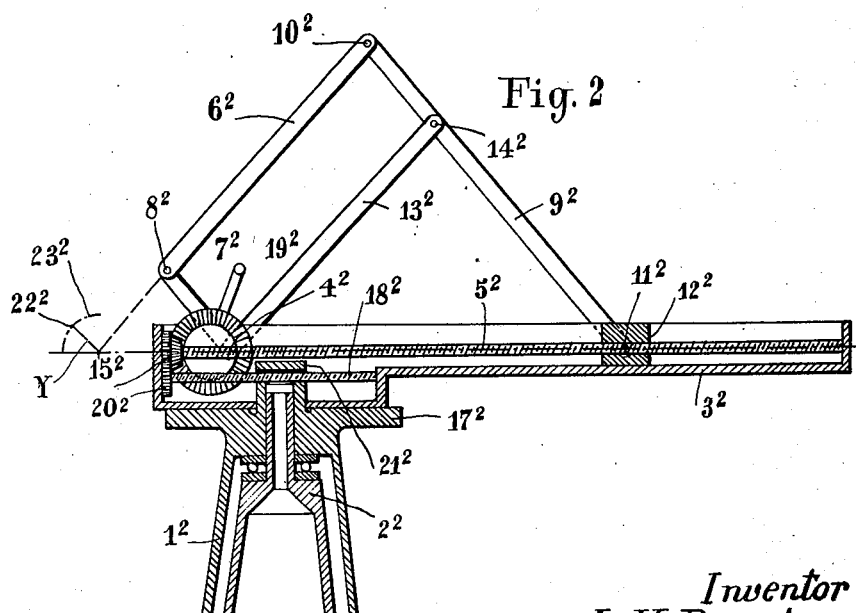

Oct. 6, 1925.
L. V. BENÉT
1,556,478
CARRIAGE FOR ANTIAIRCRAFT GUNS
Filed Feb. 28, 1925     9 Sheets-Sheet 3
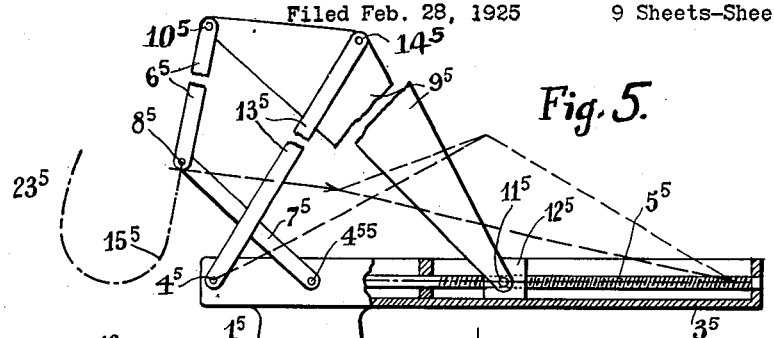
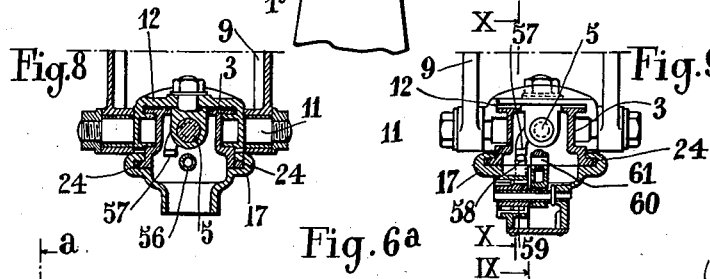
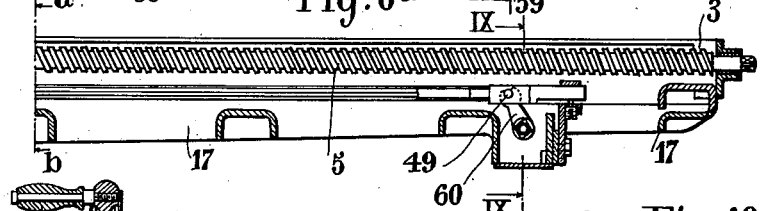
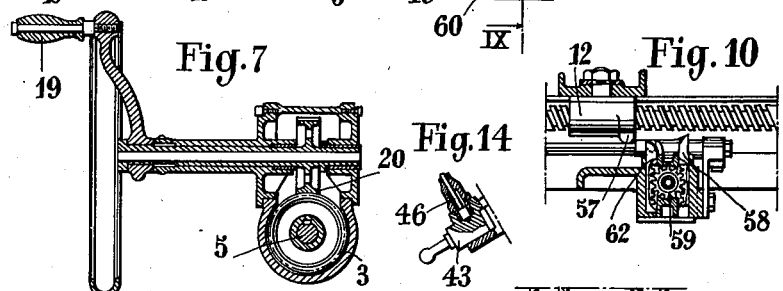
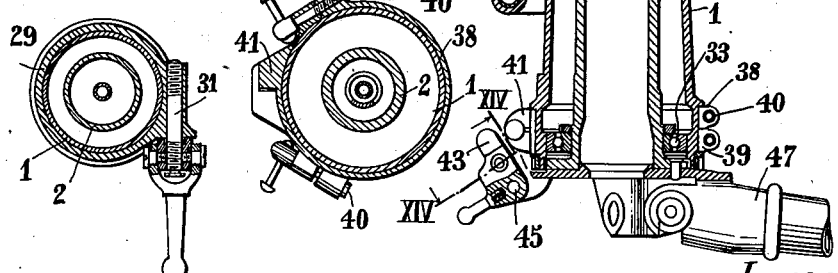
Inventor
L. V. Benét
by Wilkinson & Giusta
Attorneys.

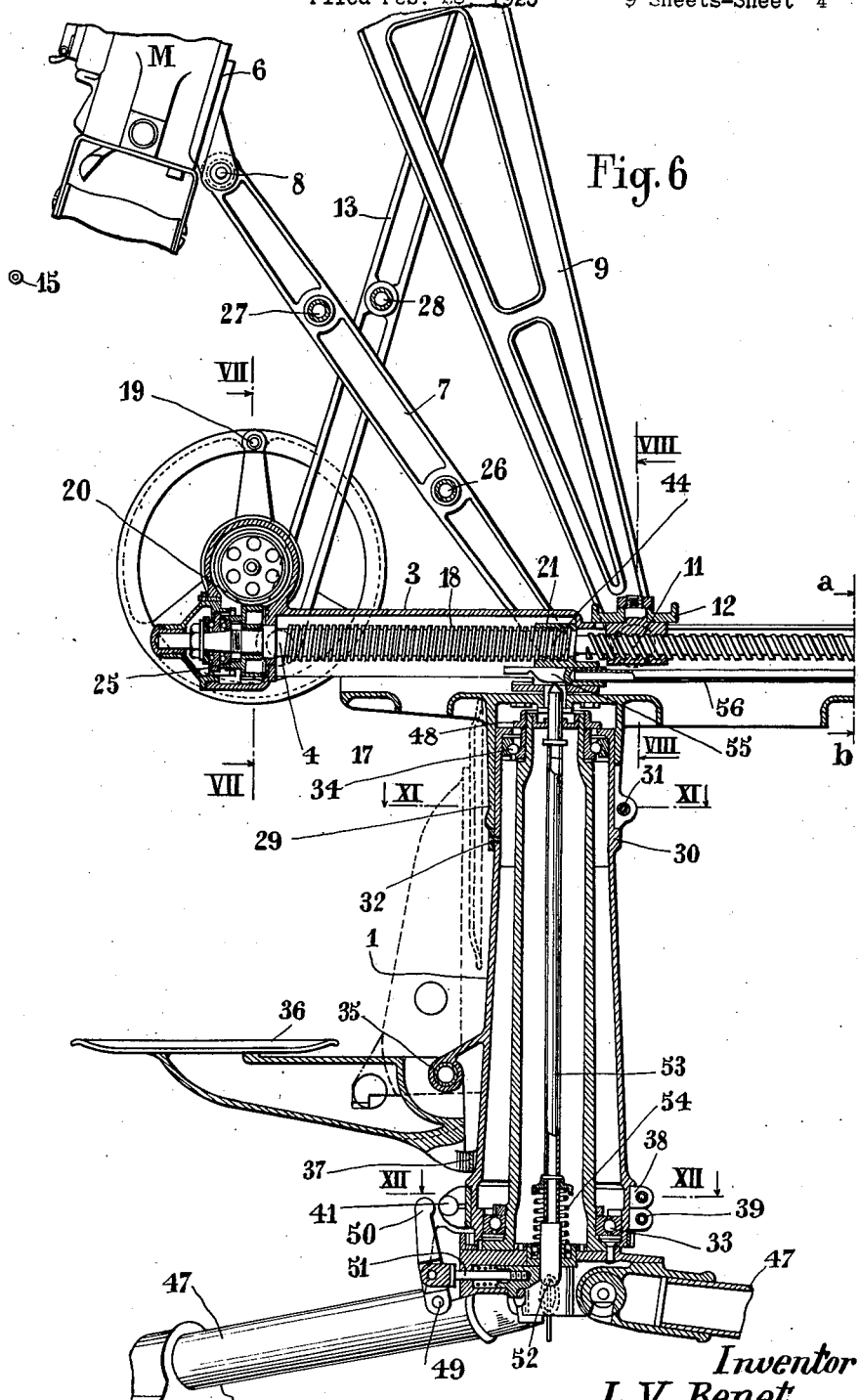

Oct. 6, 1925.

L. V. BENÉT 1,556,478

CARRIAGE FOR ANTIAIRCRAFT GUNS

Filed Feb. 28, 1925   9 Sheets-Sheet 5

Inventor
L. V. Benét
by Wilkinson & Fisota
Attorneys.

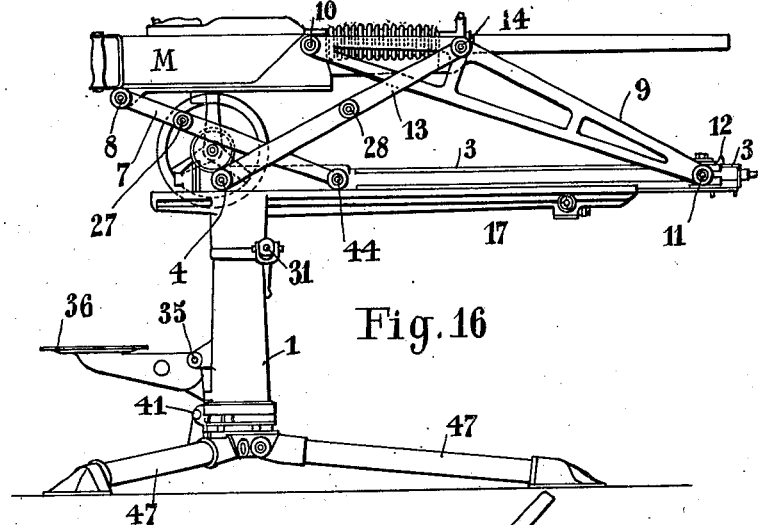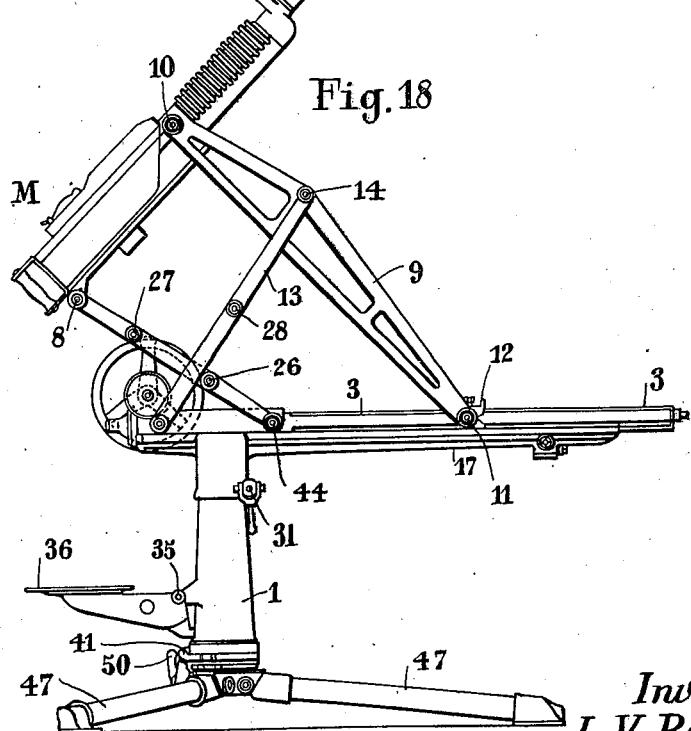

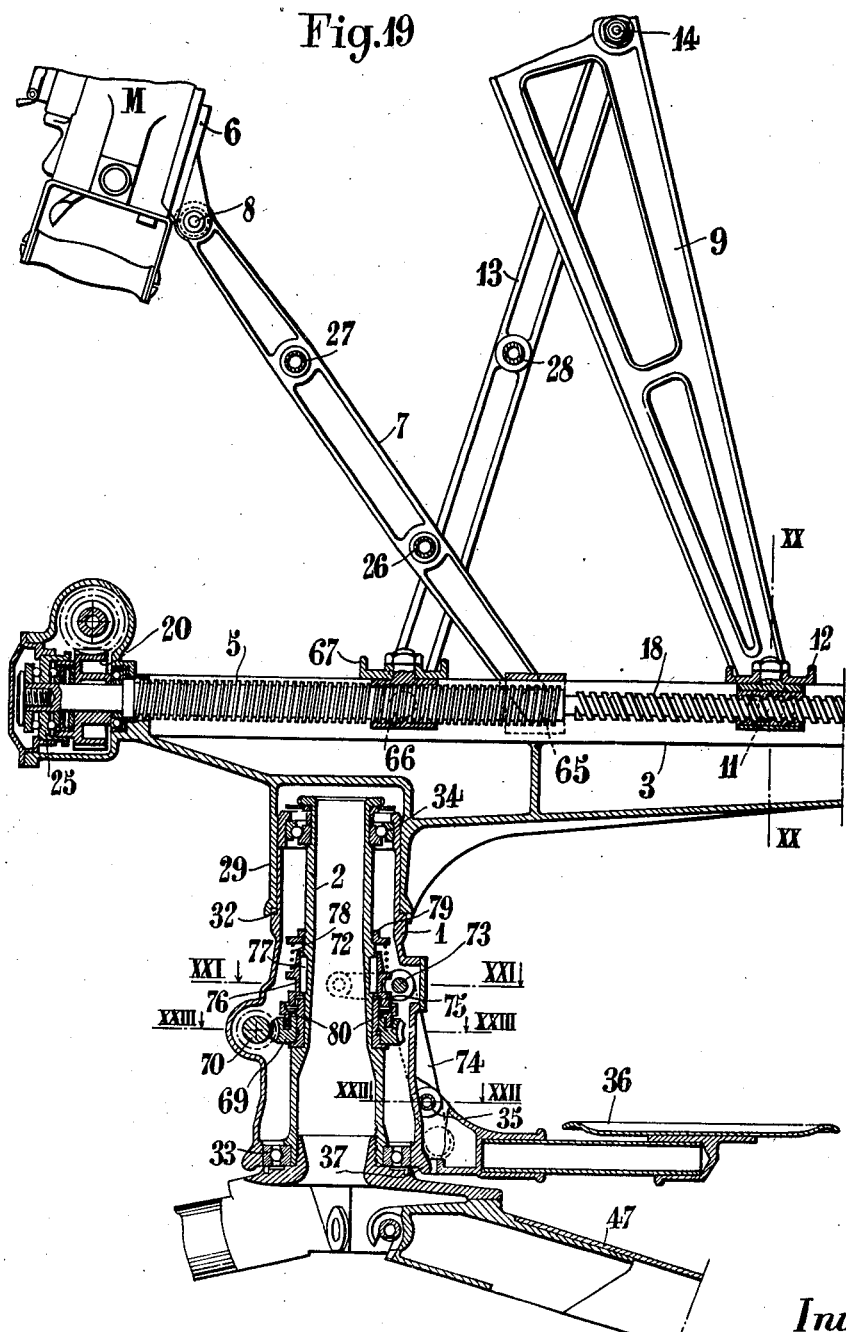

Oct. 6, 1925.
L. V. BENÉT
1,556,478
CARRIAGE FOR ANTIAIRCRAFT GUNS
Filed Feb. 28, 1925    9 Sheets-Sheet 8
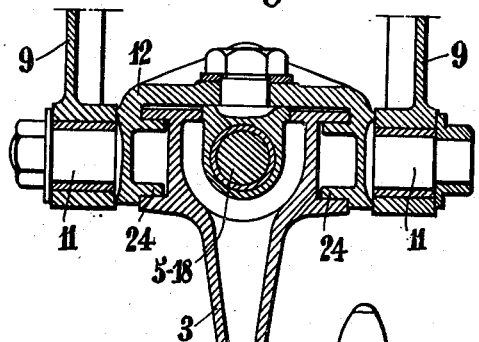
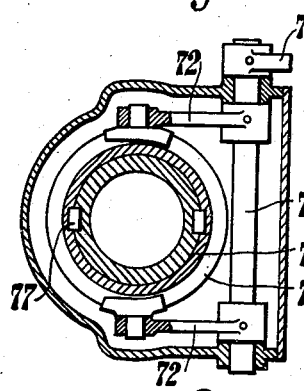
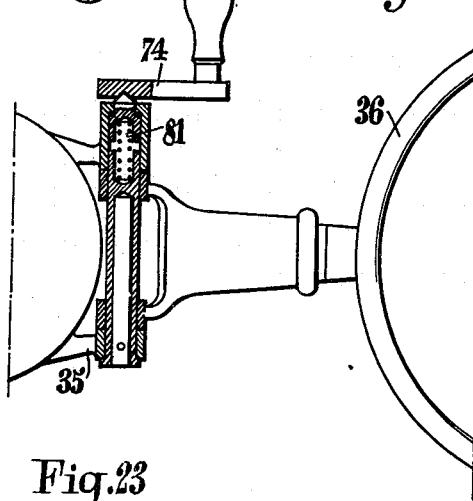
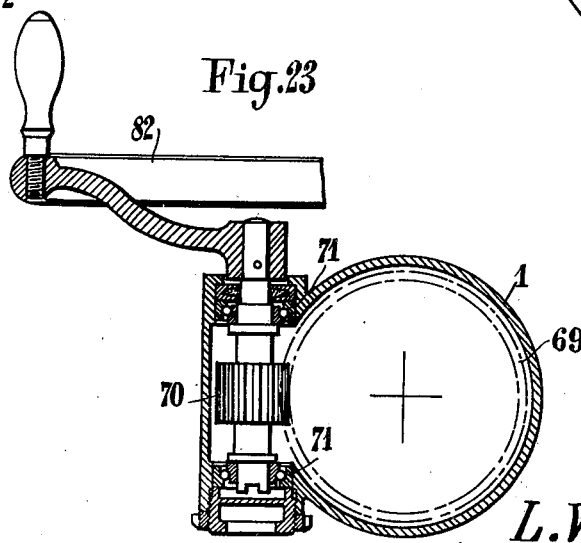
Inventor
L. V. Benet
by Wilkinson & Giusta
Attorneys.

Oct. 6, 1925.
L. V. BENÉT
1,556,478
CARRIAGE FOR ANTIAIRCRAFT GUNS
Filed Feb. 28, 1925
9 Sheets-Sheet 9
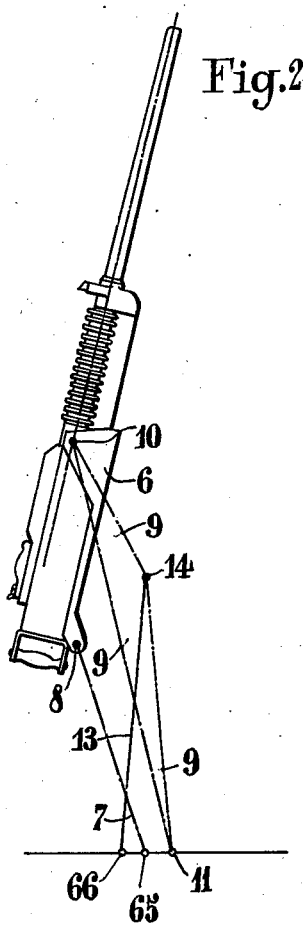
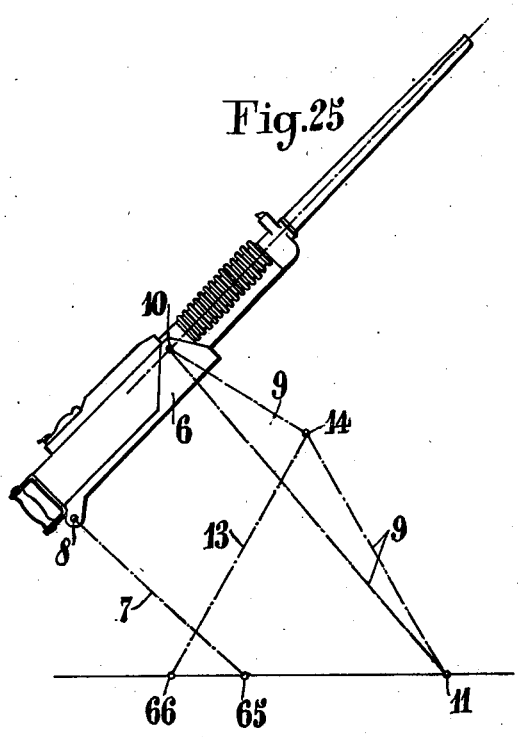
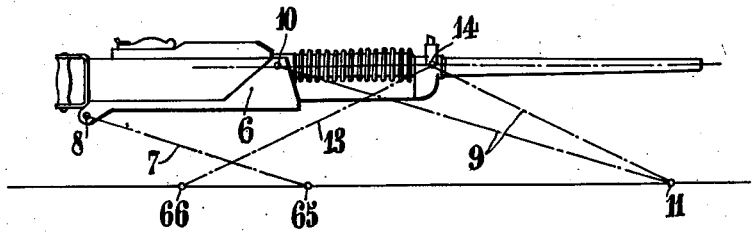
Inventor
L. V. Benét
by Wilkinson & Gusta
Attorneys.

Patented Oct. 6, 1925.

1,556,478

UNITED STATES PATENT OFFICE.

LAURENCE VINCENT BENÉT, OF LEVALLOIS-PERRET, FRANCE, ASSIGNOR TO SOCIÉTÉ ANONYME DES ANCIENS ETABLISSEMENTS HOTCHKISS & CIE., OF ST. DENIS, SEINE, FRANCE.

CARRIAGE FOR ANTIAIRCRAFT GUNS.

Application filed February 28, 1925. Serial No. 12,282.

*To all whom it may concern:*

Be it known that I, LAURENCE VINCENT BENÉT, a citizen of the Republic of the United States of America, and residing at 60 Quai Michelet, Levallois-Perret, Seine, France, have invented new and useful Improvements in Carriages for Antiaircraft Guns, of which the following is a specification.

The present invention relates to an antiaircraft gun carriage for fire-arms which enables direct aiming to be effected with a horizontal field of 360°, a vertical field of from +90° to zero, and even with negative angles, the arrangement being such that aiming can be effected rapidly and without effort and enabling the gunner to aim continuously without having to move his body relative to the gun.

The gun-carriage, according to the invention, is essentially characterized by a pivotal connection between the fire-arm or its cradle, and a support for the carriage pivoting about a vertical axis, this connection comprising three levers, the first of which connects the rear extremity of the cradle to the pivoting support, the second connecting the front extremity of the cradle to the pivoting support, and the third connecting a point of the second lever to the pivoting support, means being provided for moving the point at which the second lever is hinged to the pivoting support, so as to vary the angle of the cradle as regards the horizontal.

In practice, and for ease in construction, each lever is constituted by a pair of identical elements which are symmetrically arranged relative to the plane of fire.

According to a first modification, the pivoting support comprises a movable portion upon which are pivoted the levers, this portion being capable of movement relative to the pivoting support; the means, which enable this movement to be obtained, being preferably conjugated with those which serve to control the movement of the pivotal point of the second lever relative to the said support.

According to a second modification, the pivotal point of the third lever upon the second lever is moved forwardly relative to a line joining the extreme pivotal points of the second lever.

According to a third modification, the mechanism according to the second modification, is connected to a portion which is movable relative to the pivotal support, as in the case of the first modification.

According to a fourth modification, the pivotal point of the third lever, and the pivotal point of the first lever with the pivoting support, are separate and this latter point is situated between the former and the point at which the second lever is connected to the pivoting support.

According to a form of construction of this fourth modification of the invention, the system of levers is mounted upon a carriage which slides relative to the pivoting support by means of a differential screw, which can be actuated by hand, and of which a portion serves for the movement of said carriage, while the other portion serves to move an auxiliary carriage sliding upon the former and upon which the extremity of the second lever is pivoted.

Another form of execution of this fourth modification of the invention is characterized by the fact that the pivotal point of the first lever upon the pivoting support is fixed upon this support, while the point of connection of the third lever upon the pivoting support is movable relative to this support, the means which permit of obtaining this movement, which takes place simultaneously but in a direction opposite to that of the movement of the second lever upon the pivoting support, being preferably conjugated with those which are provided for the purpose of obtaining this latter movement.

The invention also comprises a form of construction of the pivoting support, constituted by a pivoting body fixed under this support and mounted upon a fixed vertical pivot, this pivoting body comprising a seat for the gunner immediately underneath the cradle.

The invention also comprises a device for controlling the aiming as regards direction for gun-carriages having a pivoting support of the kind mentioned above, characterized by the fact that the rotation of the pivoting support about the fixed vertical pivot is obtained by the intermediary of a manually operated mechanism. According to the invention, means are provided consisting of a clutch so as to be able, as desired, to connect this actuating mechanism to the vertical pivot, in which case the rotation of the pivoting support can only take place through the intermediary of the actuating mechanism, or the said mechanism can be made independent of the vertical pivot, and in this case the rotation of the support upon the pivot is free and can be caused by direct action upon the support.

The invention also covers a device for limiting the sweeping movement in the horizontal direction and an automatic abutment for limiting the horizontal sweeping movement when the angle of fire becomes less than a certain limit.

Further characteristics of the invention will be evident from the description which follows, taking the accompanying drawings into account, which represent the invention diagrammatically and by way of example and in which:

Fig. 1 is a diagram of the gun-carriage according to the invention;

Figs. 2 to 5 show modifications of Fig. 1;

Figs. 6 and 6a show a general view partly in section of the gun-carriage representing a form of execution of the modification according to Fig. 5.

Fig. 7 is a section along VII—VII, Fig. 6.

Fig. 8 is a section along VIII—VIII, Fig. 6.

Fig. 9 is a section along IX—IX, Fig. 6a.

Fig. 10 is a section along X—X, Fig. 9.

Fig. 11 is a section along XI—XI, Fig. 6.

Fig. 12 is a section along XII—XII, Fig. 6.

Fig. 13 shows in detail the hand-operated device for limiting the sweeping movement of the gun.

Fig. 14 is a section along line XIV—XIV, Fig. 13.

Figs. 15, 16, 17 and 18 represent the carriage in positions corresponding, respectively, to a depression of 10° and to elevations of 0°, 75°, and 45°.

Fig. 19 is a general view, partly in section, of the gun-carriage according to another form of execution of the modification of the invention shown in Fig. 5, this carriage being provided with a device for controlling the aiming for direction.

Fig. 20 is a section along XX—XX, Fig. 19.

Fig. 21 is a section along XXI—XXI, Fig. 19.

Fig. 22 is a section along XXII—XXII, Fig. 19.

Fig. 23 is a section along XXIII—XXIII, Fig. 19.

Figs. 24, 25 and 26 show diagrammatically the different positions of the system of levers for the different positions which the arm is required to assume.

Figure 15:
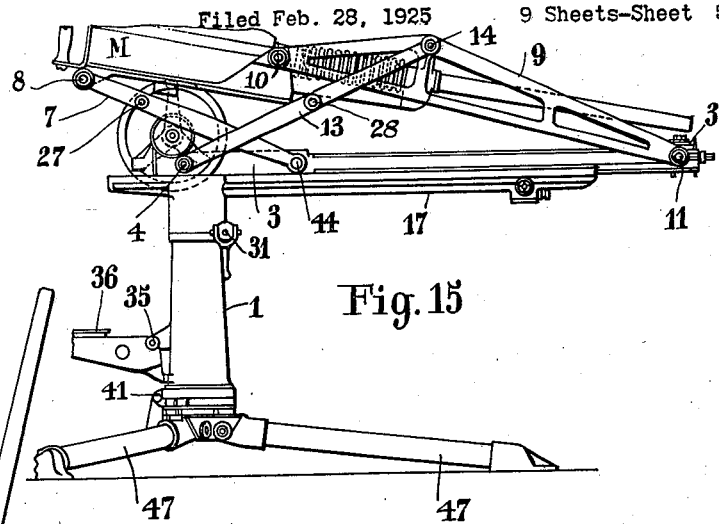

In Fig. 1 the carriage comprises a pivoting member $1^1$ which can turn about a vertical pivot $2^1$ and supports an elongated base $3^1$ fixed to the body $1^1$, this base thus participating in the movements of rotation of the body $1^1$. The base $3^1$ carries a horizontal axis $4^1$ and a horizontal screw $5^1$ which is perpendicular to the axis $4^1$ as well as to the pivot $2^1$, with which it determines the general plane of symmetry of the aiming device, which plane is also the plane of vertical firing.

The fire-arm, or, which is the same thing, the cradle $6^1$ which receives it, is connected to the pivoting support $1^1$—$3^1$, by an elevating device which is constituted by a system of levers comprising:

(a) A first lever $7^1$ connecting the rear extremity $8^1$ of the cradle to the axis $4^1$.

(b) A second lever $9^1$ connecting the front extremity $10^1$ of the cradle $6^1$ to an axis $11^1$ carried by a nut $12^1$ sliding upon the base $3^1$ and actuated by the screw $5^1$.

(c) A third lever $13^1$ connecting the point $14^1$ of the second lever $9^1$ to the axis $4^1$ of the base $3^1$.

Let us assume that the lever $13^1$, the lever $6^1$ and the portion $14^1$ to $11^1$ of the lever $9^1$ are equal in length; that the lever $7^1$ is equal to the distance $10^1$, $14^1$ and that the three points $10^1$, $14^1$ and $11^1$ lie in a straight line.

Let us assume that the gunner is seated upon a seat fixed to the pivoting body $1^1$ in such a manner that by aiming directly by the sighting line of the gun, his eye will be at $15^1$ upon the axis of the screw $5^1$ at a fixed distance $m$ from the point $8^1$ equal to the length of the lever $7^1$ and that taking the line of sight, the eye of the gunner is thus upon the line $15^1$, $4^1$.

In these circumstances, if the gunner, by turning the screw $5^1$ causes the nut $12^1$ to move from $4^1$ forwardly by a distance $2m$ equal to twice the length of the lever $13^1$ the cradle $6^1$ will pass through all angles relative to the horizontal between 90° and 0°. As the eye of the gunner constantly follows the line of sight, in the circumstances stated above, it will describe a straight line situate upon the axis $4^1$, $15^1$ and of a length equal to $2^m$.

The aiming device constructed in this manner, with a suitable proportioning of the lengths of the levers $7^1$ and $13^1$, renders it possible to make the distance $2^m$ of such a value that the gunner, in order to follow, in direct aiming, the line of sight in its variations of inclination, has only to effect a slight movement of the eye which can be effected without moving the body, merely by moving the head, the neck and if necessary the shoulders to a slight extent, which is the end in view.

If the line of sight is above the line $8^1$, $10^1$, the eye will be forced to describe a portion of the incline $16^1$ situated above the horizontal plane of the screw $5^1$ and which is shorter than the length $2^m$.

The aiming device shown in Fig. 2 in which the members corresponding to those of Fig. 1 are given the same reference letters but with index 2, differs from that of Fig. 1 in that the system of levers and of the base $3^2$, which has the form of a carriage, can move upon a table $17^2$ of the pivoting support, this movement taking place parallel to the axis of the screw $5^2$. This movement is realized by the rotation of a second endless screw $18^2$ parallel to the screw $5^2$ and which the gunner rotates at the same time as the screw $5^2$ by means of a single crank $19^2$ and of a set of gears $20^2$ in such a manner that the screws $18^2$ and $5^2$, the threads of which are of the same hand, rotate in opposite directions and at the same angular velocity. The screw $18^2$ moves the carriage $3^2$ relative to a nut $21^2$ fixed to the table $17^2$ in the same direction of movement as the carriage $12^2$ upon the screw $5^2$.

Now we have seen in Fig. 1 that when the point $11^1$ moves from the rear forwardly by a length $2^M$, which corresponds to a variation in the inclination of the cradle from 90° to 0°, the eye $15^1$ must move rearwardly to an extent equal to $2^m$. If, in Fig. 2, the screw $18^2$ is given a pitch the ratio of which relative to the screw $5^2$ is equal to the ratio of $m$ to $M$, the carriage $3^2$ will advance by a distance $2^m$ during the stroke $2^M$ of the carriage $12^2$ upon the screw $5^2$ and the point $15^2$ where the eye should be in order to retain the line of sight, will remain fixed in space so that the gunner by merely rotating the neck will be able to conserve his aim for direct sighting.

When it is necessary that the eye of the gunner in order to take aim must be placed at a point $22^2$ situated above the line $8^2$, $10^2$ at a distance Y from $15^2$ he will have to describe a quarter of a circle $23^2$. The distance Y can be chosen in such a manner that the eye of the gunner can describe the arc $23^2$ without moving the shoulders, which is the end in view.

In practice, the devices shown in Figs. 1 and 2 render it necessary to limit the vertical field of fire to angles comprised between 75° and 15°, otherwise one only has a mediocre stability during fire owing to the fact that the polygon of levers would be too open or too closed for firing angles in the neighbourhood of 90° or 0°.

This drawback can be obviated by means of the system shown in Figs. 3 and 4, which differ among themselves in the same way as the systems shown in Figs. 1 and 2, that is to say they are, or not, provided with the auxiliary screw $18^2$ or $18^4$ which enables firing angles of 90° and 0° and even negative angles to be obtained without the stability of the set of levers being effected, while at the same time only causing a very slight movement of the head of the gunner.

The systems shown in Figs. 3 and 4 differ respectively from the systems shown in Figs. 1 and 2 in that the axes $14^3$ and $14^4$ instead of being in alignment with the axes $10^3$ and $11^3$, on the one hand, and $10^4$ and $11^4$ on the other hand, are fixed to the levers $9^3$ and $9^4$ above and in front of this line, the levers $9^3$ and $9^4$ then having a triangular form. The levers $13^3$ and $13^4$ are respectively equal to the distance $14^3$—$11^3$ and $14^4$—$11^4$.

If, in Fig. 3, the lengths of the levers are suitably chosen, the cradle $6^3$ will assume inclinations going from plus 90° to negative angles without the angles of the levers prejudicing the stability of the system during firing (see the extreme positions shown in dotted lines). The limit of the negative inclinations of the cradle will be found at the point where the line of fire and the axis of the screw $5^3$ or its support $3^3$ meet.

The system shown in Fig. 3 causes the eye $15^3$ to describe a curve $23^3$ the amplitude of which is continually compatible with the end in view; it will furthermore be noticed that the position of the eye is, in the case of firing angles of approximately 90° and of 0°, more remote from the base of the system than in the case of the system shown in Fig. 1.

Finally the complete evolution in the vertical field only necessitates the utilization of a lesser length of the screw $5^3$ thereby rendering it possible to reduce weight and to obtain greater rapidity in aiming; furthermore the differences in inclination of the cradle $6^3$ are more uniform if the carriage $12^3$ is caused to advance upon the screw $5^3$ with a continuous movement.

If, in the case of the system shown in Fig. 3, a movement is communicated thereto parallel to that of the nut $12^3$ and in the same direction as is the case in Fig. 2, the curve $22^3$ can be flattened or even reversed ($23^a$, $23^b$, $23^c$) which renders it possible to still further reduce the movement of the eye and results in the aiming system shown in Fig. 4.

In the system shown in Fig. 4 one has taken advantage of the fact that the useful length of the actuating screw was shorter and situated further forward, to use a single differential screw formed of two portions $5^4$, $18^4$ having right and left hand threads, which enable the gear mechanism $20^4$ driven by the crank $19^4$ to be reduced, and to lighten the carriage $3^4$. The ratio of the pitch has been chosen in such a manner as to cause the eye to describe a very flat curve which is well away from the apparatus and which has an amplitude such that, as has been described above, the gunner can easily follow the movement of this sighting line for direct aiming without moving his head or at the most his shoulders more than a few centimetres. Finally as regards the extreme firing angles, the angles of the levers relative to each other are sufficient to ensure satisfactory stability.

The system of aiming for elevation of Fig. 5 is similar to that of Fig. 3 with the following modification: Instead of being mounted upon the same shaft as the lever $13^5$ the lever $7^5$ is longer than the lever $7^3$ and is mounted upon a shaft $4^{55}$ which is situated in front of the shaft $4^5$. The radius $7^5$ being greater than $7^3$, the arc of a circle described by $8^5$ is flatter, the result is that the curve $23^5$ followed by the eye $15^5$ during the variations in aiming is also flatter. Moreover, for the same length of screw $5^5$ one can obtain, with the system shown in Fig. 5, positions of $15^5$ which are situated further back than with the system of Fig. 3 for firing angles adjacent to 90°, while at the same time the angles formed by the levers among themselves are still more favourable as regards stability. The recoil is almost entirely absorbed by the lever $13^5$ which always lies at a slight angle to the direction of the cradle $6^5$.

In the device shown in Figs. 6 and $6^a$, which constitutes one form of realization of the modification shown in Fig. 5, the whole of the hinged system is mounted upon a differential screw similar to the screw $18^4$ of Fig. 4, with this advantage that owing to the flattening of the curve realized by the system of Fig. 5, the differential screw of Fig. 6 will be shorter than that of Fig. 4 to obtain the same result.

Figure 17:
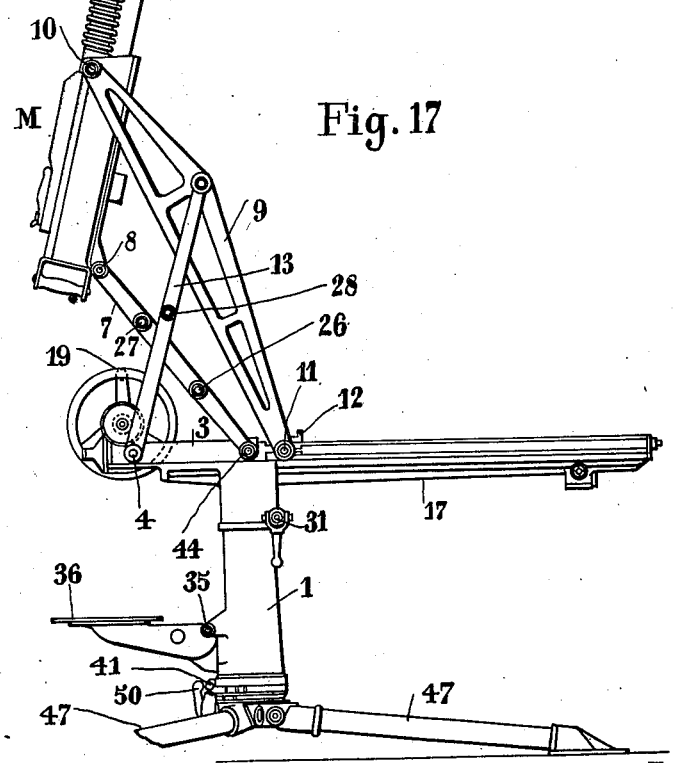

In the aiming device of Figs. 6 and $6^a$, of which Figs. 15 to 18 show different positions, the different parts have been given the same references as those of the corresponding parts of Figs. 1 to 5 but without any index. Each of the levers 7, 9, 13 is constituted by a pair of identical elements arranged symmetrically to the plane of fire of the fire-arm M which is constituted, for example, by a machine-gun mounted upon the cradle 6.

The carriage 12 which carries the shaft upon which the lever 9 is pivoted, slides in grooves in a main carriage 3 which, in turn, can slide by means of ribs 24 in the corresponding grooves of the table 17 supporting the aiming system proper.

The differential screw 5, 18 is mounted upon the main carriage 3 and is held by a double-acting ball-thrust bearing 25; it is actuated by the crank 19 and the helicoidal gearing 20.

The movement of the carriage 3 upon the table 17 is effected by the action of the screw 18 upon the nut 21 bolted upon the table 17.

The levers 7 and 13 are hinged at 44 and 4, respectively upon the carriage 3. Stays 26, 27, 28 connect together the elements of the pairs of levers 7 and 13.

The table 17 carries at its lower portion a vertical cylindrical sleeve 29 which fits upon the upper portion of the pivoting member 1 and is held against the shoulder 30 by a clamping screw 31. A notch formed in the lower edge of the sleeve 29 engages a pin 32 carried by the member 1 and thereby prevents the sleeve 29 from rotating relative to the pivoting body 1.

The pivoting body 1 is centred upon the vertical pivot 2 by a bearing 33 and rests upon this pivot by means of an abutment 34 and can rotate freely about the pivot 2. The pivoting body 1 carries at its lower portion a cap 35 upon which there is pivoted a seat 36, which is raised during transport along the pivoting body 1 and can be swung down horizontally and can then rest upon an abutment 37 so as to form a seat for the gunner. The centre of the seat 36 is placed in the vertical plane in which the fire-arm moves, in the case of aiming for elevation, and is placed at a height above the ground which is sufficient that, by exerting pressure by the foot upon the ground or upon the firing platform, the gunner can easily cause the pivoting member 1, which carries him to rotate, together with the fire-arm, with the necessary rapidity of angular displacement in the horizontal plane which is necessary for anti-aircraft fire.

Since the gunner remains therefore constantly in the plane of fire and as in this plane, as has been described above he has only to effect very slight movements of the head and shoulders in order to follow the variation in the angle of fire, he has therefore every facility for rapidly effecting continuous direct aiming at the aircraft forming the target without having to move relative to the fire-arm.

At the lower portion of the pivoting body 1, Figs. 12 and 13, two collars 38 and 39 can be fixed to this body by means of clamping screws 40 and can be adjusted in such a manner as to control the positioning of the abutments 41 which are arranged opposite to each other at the same level. A tappet 43 pivoting above a horizontal axis 45 mounted upon the base of the pivot 2, can be moved by hand into the path of the abutments 41 which in this case act limitatively as regards sweeping fire. In the active position the tappet 43 is held in place by a spring pin 46, Fig. 14.

The vertical pivot 2 is essentially constituted by a vertical column, the base of which may either be bolted onto the deck of a ship, the chassis of a motor car, a fixed platform or can be placed upon the ground by means of a tripod 47. At the upper portion of the column 2 there is provided a circular shoulder which serves as a support for the ball thrust bearing 34, which latter supports the weight of the pivoting body of the aiming mechanism and of the fire-arm. The cylindrical portion provided at the lower extremity of the column 2 receives the ball bearing 33 which serves as a guide for the pivoting body 1. The vertical pivot 2 is made hollow so as to permit of the passage of the device actuating the safety mechanism which will be described below. A nut 48 prevents the pivoting body 1 from being separated from the pivot 2 when the sleeve 29 is removed.

The safety device or automatic abutment shown in Figs. 6, 9 and 10 is intended to limit automatically the horizontal field of fire to an extent and direction determined by the abutment 41 of the collars 38 and 39. This is by way of a measure of security since when the angle of fire falls beneath a predetermined value a field of 360° is dangerous for the non-hostile neighbourhood.

Instead of the hand operated tappet 43, or in conjunction therewith, there is pivoted at 49 upon a horizontal shaft fixed to the pivot 2 an abutment lever 50. This lever is under the influence of a spring rod 51 and tends constantly to approach its head to the axis of the pivot 2, that is to say to place it in the trajectory of the abutments 41 of the members 38 and 39 which limit the sweeping fire. It is prevented from doing so as long as the rod 51 meets the rounded head 52 of a vertical rod 53 which is situated in the axis of the pivot 2. This rod 53 which is forced upwardly by a spring 54, tends to rise and to enable the abutment 50 to come into action, but the rod 53 strikes against an inclined plane 55 fixed to the rear portion of another rod 56 which is horizontal and parallel to the screw 5 and is situated in the base 17. When the carriage 12 comes near the forward end of the screw 5, which corresponds to a slight firing angle, a cam 57 which it carries, Fig. 10, depresses a rack 58 by means of an inclined plane. This rack causes the rotation of a toothed wheel 59 with which it engages, and a fork 60 fixed to this wheel 59 causes the rod 56 to advance by the intermediary of two cylindrical lugs 61. The inclined plane 55 then advances, the rod 53 rises, its head escapes the rod 51 and the abutment 50 places itself in the trajectory of the members 38, 39, which act to limit horizontal sweeping fire.

The position of the rack 58 upon the base 17 determines the minimum angle of safety below which the abutment 50, coming automatically into play, will limit the horizontal sweeping fire to an extent and a direction adjustable by the collars 38 and 39. But when the rack 58 has been depressed by the carriage 12, another rack 62, symmetrical with 58 relative to the toothed wheel 59 has risen behind the cam 57 of the carriage 12 so that if the fire-arm M is again given firing angles greater than the safety angle decided upon, that is to say, if the carriage 12 moves back, the rack 62 is depressed by the cam 57, the wheel 59 and the fork 60 rotate in a direction opposite to the preceding one, the abutment 50 is disengaged from the means for limiting the sweeping fire and horizontal sweeping fire again becomes free.

Fig. 19 shows another form of execution of the modification shown in Fig. 5. The various parts of this device have been designated by the same reference letters as those of the corresponding parts in the device shown in Figs. 6, 6ª.

In the case of Fig. 19, the first lever 7 is pivoted upon a shaft 65 fixed upon the elongated base 3 which is in one piece with the pivoting support, while the second and third levers 9 and 13 are hinged upon shafts 11 and 66 respectively mounted on the carriages 12 and 67. These two carriages 12 and 67 move simultaneously in opposite direction under the action of the differential screw 5—18 having right and left handed threads the portion 5 of this screw serving to move the carriage 67, while the portion 18 serves to move the carriage 12. Obviously the pitches of the screw 5—18 will be determined according to the ratio of the speeds of movement of the carriages 12 and 67 which it is desired to obtain.

In Figs. 24, 26 there are shown a number of positions which can be assumed by this device for aiming for elevation. As can be seen in these figures, the rear extremity 8 of the cradle 6 rotates about the axis 65 which is fixed upon the base 3; the shafts 66 and 11 move in opposite directions with the carriages 67 and 12 upon which they are mounted respectively.

The curve described by the eye of the gunner, who follows the line of sight in continuous aiming, from the maximum angle of fire, which is approximately 80°, up to the minimum angle of fire is substantially a short arc of a circle having its centre upon the seat of the gunner if suitable proportions are chosen for the levers and the pitches of the differential screw.

The pivoting support of the gun-carriage according to Fig. 19 is provided with a device which makes it possible to render the rotation of this support 1 free upon the pivot 2 or, on the contrary, to effect this rotation by manually operated means.

With this end in view, there is mounted freely upon the vertical pivot 2 a toothed-crown 69 engaging with a worm 70 mounted upon the pivoting support 1 by the intermediary of ball-bearings 71 which form an abutment.

Upon the pivot 2 there can move longitudinally under the influence of a forked lever 72, pivoting at 73 and operated by an arm 74, a sleeve 75 having a groove 76 in which engage the forks of the lever 72, this sleeve 75 being prevented by keys 77 from rotating about this pivot. Between this sleeve 75 and the toothed-crown 69 there are arranged steel washers 80, this sleeve being drawn back by a spring 78 which bears upon a threaded ring 79 screwed upon the pivot 2.

When the lever 72 occupies the position shown in Fig. 1, in which it is held by a spring-pin 81 (Fig. 22) the sleeve 75 is moved away from the crown 69. The washers 80 not being under any pressure, this toothed-crown 69 can turn freely upon the pivot 2. If, in these circumstances, the worm 70 is rotated, for example, by means of a hand-wheel 82 (Fig. 23) the crown 69 will participate in this movement but the support 1 will remain fixed relative to the pivot 2. In order to cause this support to rotate in one direction or the other about this pivot, it is sufficient to exert a direct action upon this support.

On the other hand, if the arm 74 of the spring pin 81 is released, under the influence of the spring 78, the sleeve 75 will press the washers 80 between it and the crown 69. This crown will thus be fixed to the sleeve 75 and will consequently be connected to the pivot 2. If the worm 70 is then rotated, this latter will not be able to cause rotation of the crown 69, with which it is still in engagement. The movement resulting from the rotation of the worm 70 about its axis will therefore be a rotation of the pivoting support 1, which is fixed to this worm, about the pivot 2.

Any action upon the hand-wheel 82 results therefore in a rotation of the pivoting support. It is evident from the known properties of a worm and worm-wheel gearing, that this movement is irreversible.

Apart from the advantages of enabling the rotation of the pivoting support 1, to be obtained in a rational manner, this actuating device presents the advantage of obtaining between the support and the pivot a connection giving a certain elasticity which absorbs the shocks which might be produced during the aiming of the fire-arm as regards direction. When these shocks arise, a certain sliding movement takes place between the various washers 80, so that the shocks are absorbed and do not cause any damage.

It will moreover, be understood that this device for aiming as regards direction is applicable to all firearms mounted upon a pivot.

It is obvious that the invention has only been shown by way of a purely explanatory example, and in no way limitatively, and that certain modifications in details could be made without altering the spirit of the invention.

I claim:

1. A carriage for anti-aircraft guns, comprising a vertical axis, a support capable of pivoting about said axis, a lever connecting the rear extremity of the gun to said support, a second lever connecting the front extremity of the gun to said support, a third lever connecting a point on said second lever to the support and means for shifting the point at which said second lever is hinged to the pivoting support.

2. A carriage for anti-aircraft guns, comprising a vertical axis, a support capable of pivoting about said axis, a cradle for receiving the gun, a lever connecting the rear extremity of said cradle to said support, a second lever connecting the front extremity of the cradle to said support, a third lever connecting a point on said second lever to the support and means for shifting the point at which said second lever is hinged to the pivoting support.

3. A carriage for anti-aircraft guns, comprising a vertical axis, a support capable of pivoting about said axis, a lever connecting the rear extremity of the gun to said support, a second lever connected to the front extremity of the gun, a third lever connecting a point on said second lever to the support, a screw mounted in said support, and a nut adapted to be moved by the rotation of said screw, said second lever being connected to said nut.

4. A carriage for anti-aircraft guns, comprising a vertical axis, a support capable of pivoting about said axis, a cradle for receiving the gun, a lever connecting the rear extremity of said cradle to said support, a second lever connected to the front extremity of the cradle, a third lever connecting a point on said second lever to the support, a screw mounted in said support, and a nut adapted to be moved by the rotation of said screw, said second lever being connected to said nut.

5. A carriage for anti-aircraft guns, comprising a vertical axis, a support capable of pivoting about said axis, a horizontal axis in said support, a lever connecting the rear extremity of the gun to said support, a screw mounted in said support, a nut mounted on said screw, a second lever connecting the front extremity of said gun to said nut, a third lever connecting a point on said second lever to said horizontal axis and means for rotating said screw.

6. A carriage for anti-aircraft guns, comprising a vertical axis, a support capable of pivoting about said axis, a horizontal axis in said support, a cradle for receiving the gun, a lever connecting the rear extremity of said cradle to said support, a screw mounted in said support, a nut mounted on said screw, a second lever connecting the front extremity of said cradle to said nut, a third lever connecting a point on said second lever to said horizontal axis and means for rotating said screw.

7. A carriage for anti-aircraft guns, comprising a vertical axis, a support capable of pivoting about said axis, a base member mounted on said support, a system of levers connecting the gun to said base-member, a screw mounted in said base-member, one of said levers engaging said screw by means of a nut, a second screw mounted in said base-member and passing through a nut in said support and means for actuating both screws simultaneously in opposite directions.

8. A carriage for anti-aircraft guns, comprising a vertical axis, a support capable of pivoting about said axis, a cradle for receiving the gun, a base-member mounted on said support, a system of levers connecting said cradle to said base-member, a screw mounted in said base-member, one of said levers engaging said screw by means of a nut, a second screw mounted in said base-member and passing through a nut in said support and means for actuating both screws simultaneously in opposite directions.

9. A carriage for anti-aircraft guns, comprising a vertical axis, a support capable of pivoting about said axis, a base-member slidably mounted on said support, a system of levers connecting said gun to said base-member, a screw having right- and left-hand threads mounted in said base-member, a nut on said support engaging the threads of the one hand, a nut connected to one of said levers and engaging the threads of the other hand and means for rotating said screw.

10. A carriage for anti-aircraft guns, comprising a vertical axis, a support capable of pivoting about said axis, a cradle for receiving the gun, a base-member slidably mounted on said support, a system of levers connecting said cradle to said base-member, a screw having right- and left-hand threads mounted in said base-member, a nut on said support engaging the threads of the one hand, a nut connected to one of said levers and engaging the threads of the other hand and means for rotating said screw.

11. A carriage for anti-aircraft guns, comprising a vertical axis, a support capable of pivoting about said axis, a screw mounted in said support, a nut engaging said screw, a lever connected by one end to said nut, and by the other end to the gun, a second lever connecting the rear extremity of said gun to said support, a horizontal axis at the rear extremity of said support, a third lever connecting said axis to a point on said first lever between its point of connection to the cradle and its point of connection to the nut.

12. A carriage for anti-aircraft guns, comprising a vertical axis, a support capable of pivoting about said axis, a screw mounted in said support, a nut engaging said screw, a lever connected by one end to said nut, a cradle for the gun to which cradle the other end of said lever is pivoted, a second lever connecting the rear extremity of said cradle to said support, a horizontal axis at the rear extremity of said support, a third lever connecting said axis to a point on said first lever between its point of connection to the cradle and its point of connection to the nut.

13. A carriage for anti-aircraft guns, comprising a vertical axis, a support capable of pivoting about said axis, a screw mounted in said support, a system of levers connecting the gun to said support, one of said levers having a nut engaging said screw, a cam-surface on said nut, abutments on said pivotal support, an abutment lever tending to engage said abutments, means for holding said lever out of such engagement and means actuated by the cam on said nut in a predetermined position of this latter to release said lever to allow it to enter the trajectory of the abutments.

LAURENCE VINCENT BENÉT.